United States Patent
Park et al.

(10) Patent No.: US 10,081,008 B2
(45) Date of Patent: Sep. 25, 2018

(54) POROUS IRON-SILICATE WITH RADIALLY DEVELOPED BRANCH, AND IRON-CARBIDE/SILICA COMPOSITE CATALYST PREPARED THEREFROM

(71) Applicant: Korea Institute of Energy Research, Daejeon (KR)

(72) Inventors: Ji Chan Park, Daejeon (KR); Dong Hyun Chun, Daejeon (KR); Heon Jung, Daejeon (KR); Ho Tae Lee, Daejeon (KR); Jung Il Yang, Daejeon (KR); Sung Jun Hong, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 39 days.

(21) Appl. No.: 15/122,332

(22) PCT Filed: May 15, 2015

(86) PCT No.: PCT/KR2015/004906
§ 371 (c)(1),
(2) Date: Nov. 14, 2016

(87) PCT Pub. No.: WO2015/174785
PCT Pub. Date: Nov. 19, 2015

(65) Prior Publication Data
US 2017/0065965 A1 Mar. 9, 2017

(30) Foreign Application Priority Data
May 16, 2014 (KR) .................. 10-2014-0058772

(51) Int. Cl.
*B01J 27/22* (2006.01)
*B01J 37/00* (2006.01)
(Continued)

(52) U.S. Cl.
CPC ............ *B01J 27/22* (2013.01); *B01J 23/745* (2013.01); *B01J 35/0013* (2013.01);
(Continued)

(58) Field of Classification Search
USPC ....................................................... 502/177
See application file for complete search history.

(56) References Cited

FOREIGN PATENT DOCUMENTS

| JP | 2008006406 A | 1/2008 |
|---|---|---|
| KR | 1020130011505 A | 1/2013 |

(Continued)

OTHER PUBLICATIONS

Mogorosi et al (Strong-metal-support interaction by molecular design: Fe-silicate interactions in Fischer-Tropsch catalyst, J of Cata 289 (2012) 140-150).*
International Search Report issued in corresponding application No. PCT/KR2015/004906 dated Jul. 14, 2015 (4 pages).
Written Opinion of the International Searching Authority issued in corresponding application No. PCT/KR2015/004906 dated Jul. 14, 2015 (7 pages).
(Continued)

*Primary Examiner* — Melvin C. Mayes
*Assistant Examiner* — Michael Forrest
(74) *Attorney, Agent, or Firm* — Osha Liang LLP

(57) ABSTRACT

The present invention provides an iron-carbide/silica composite catalyst that is highly reactive to a Fischer-Tropsch synthesis by firstly forming an iron-silicate structure having large specific surface area and well-developed pores through a hydrothermal reaction of an iron salt with a silica particle having a nanostructure, and then activating the iron-silicate structure in a high temperature carbon monoxide atmosphere. When using the iron-carbide/silica composite catalyst according to the present invention in the Fischer-Tropsch synthesis reaction, it is possible to effectively prepare liquid hydrocarbon with a high CO conversion rate and selectivity.

13 Claims, 7 Drawing Sheets
(3 of 7 Drawing Sheet(s) Filed in Color)

(51) Int. Cl.
  *B01J 35/10* (2006.01)
  *B01J 35/00* (2006.01)
  *C10G 2/00* (2006.01)
  *B01J 37/08* (2006.01)
  *B01J 23/745* (2006.01)
  *B01J 37/10* (2006.01)

(52) U.S. Cl.
  CPC ....... *B01J 35/1014* (2013.01); *B01J 35/1019* (2013.01); *B01J 35/1023* (2013.01); *B01J 35/1038* (2013.01); *B01J 35/1042* (2013.01); *B01J 35/1047* (2013.01); *B01J 37/009* (2013.01); *B01J 37/088* (2013.01); *B01J 37/10* (2013.01); *C10G 2/332* (2013.01)

(56) References Cited

FOREIGN PATENT DOCUMENTS

| KR | 1020130045024 A | 5/2013 |
| KR | 10-1339902 B1 | 12/2013 |
| KR | 10-1393413 B1 | 5/2014 |

OTHER PUBLICATIONS

Andrei, Y. Khodakov et al., Chem. Rev., 2007, 107, 1692-1744 (53 pages).
Park, Ji Chan et al., "Ni@SiO2 yolk-shell nanoreactor catalysts: High temperature stability and recyclability" Journal of Materials Chemistry, vol. 2, No. 7, Feb. 2010, p. 1239-1246 (9 pages).

* cited by examiner

[Fig. 1]
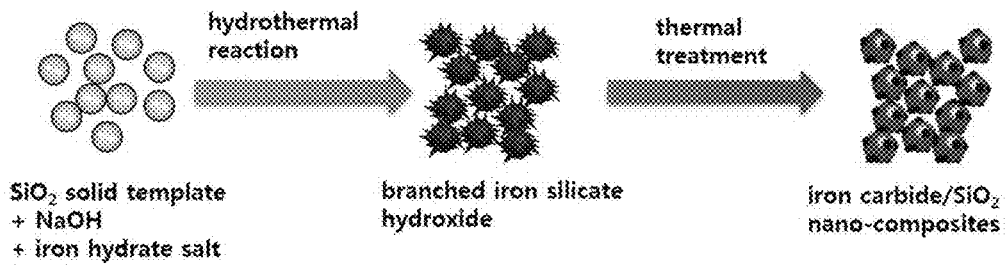
[Fig. 2]
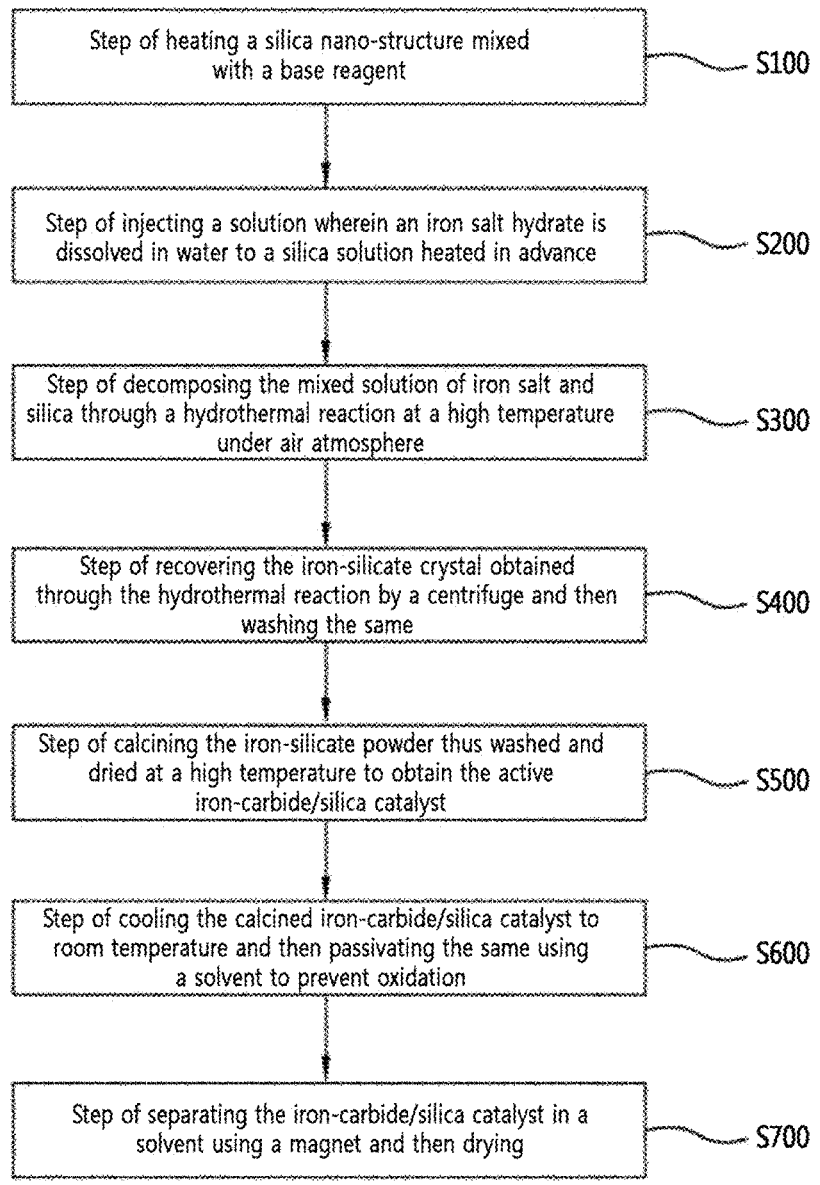

[Fig. 3]
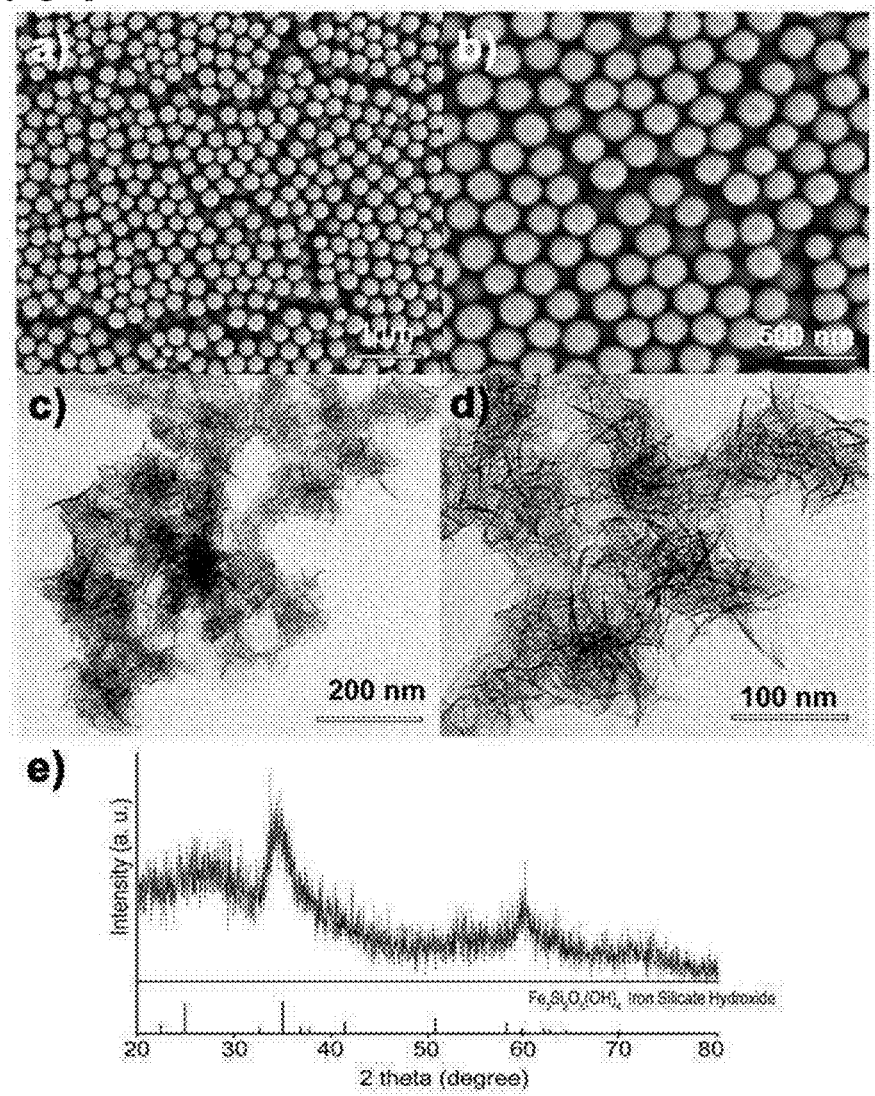

[Fig. 4]
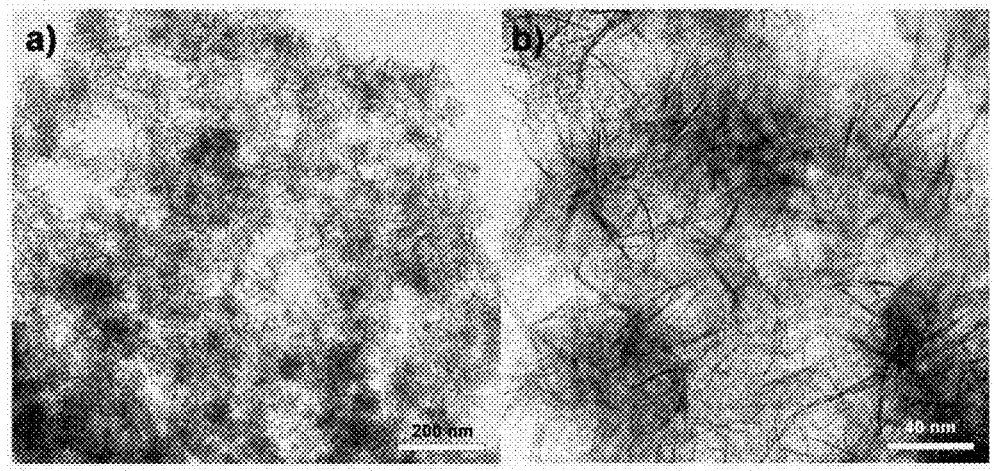
[Fig. 5]
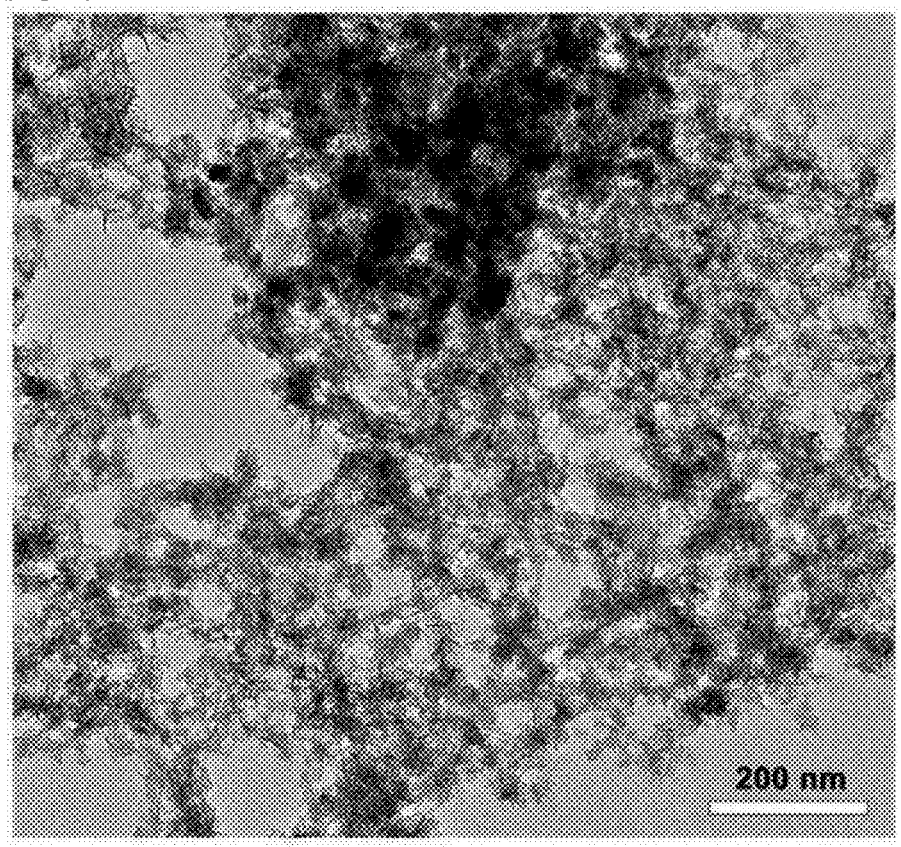

[Fig. 6]
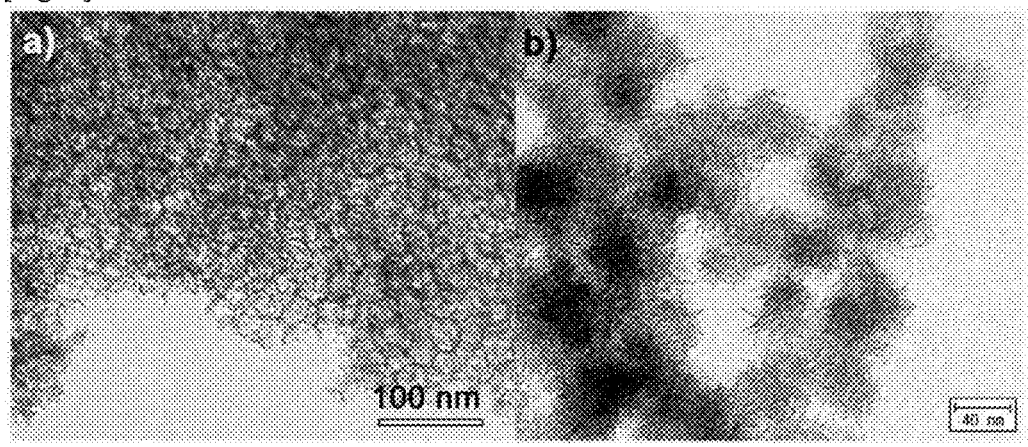
[Fig. 7]
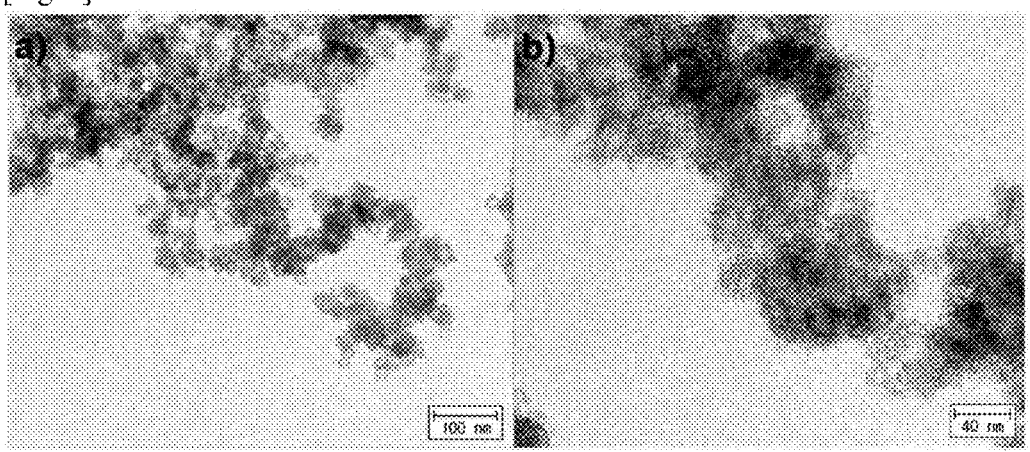
[Fig. 8]
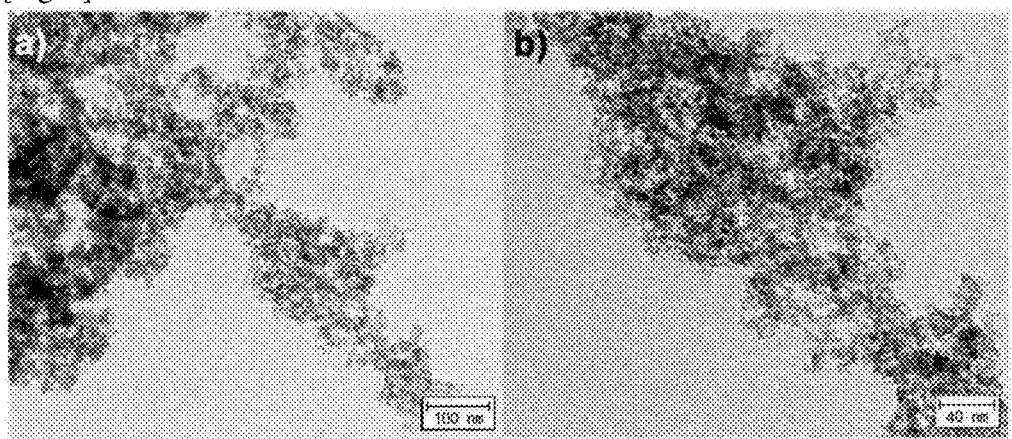

[Fig. 9]
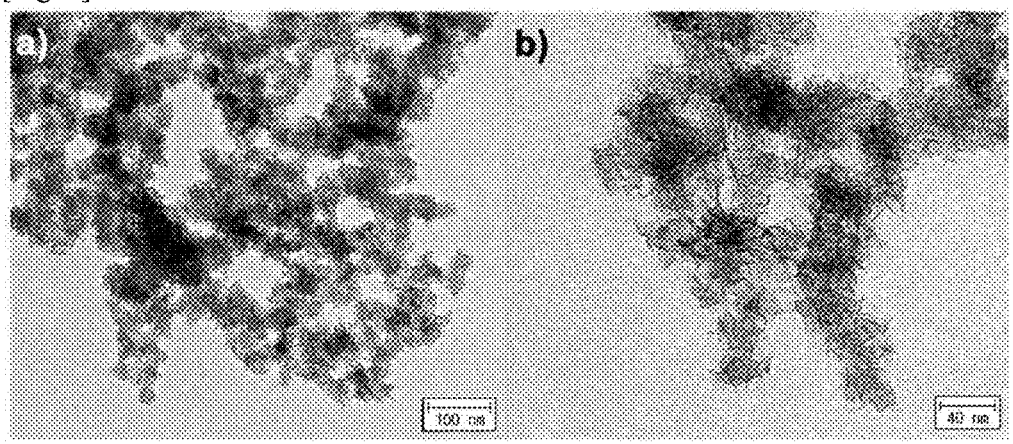
[Fig. 10]
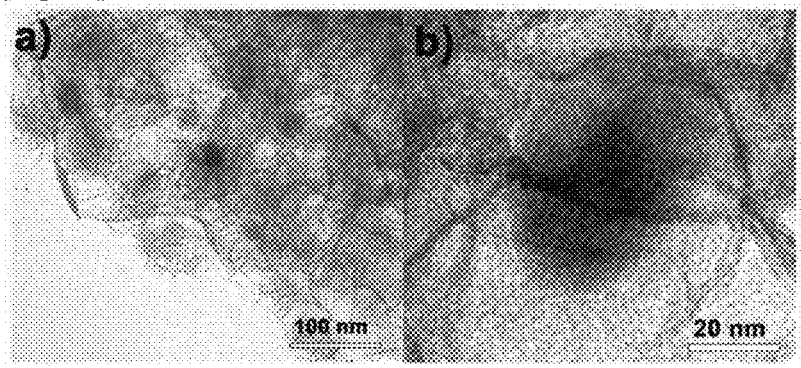
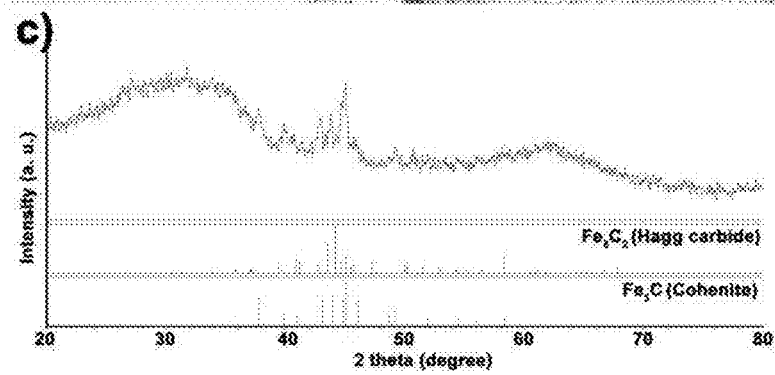

[Fig. 11]
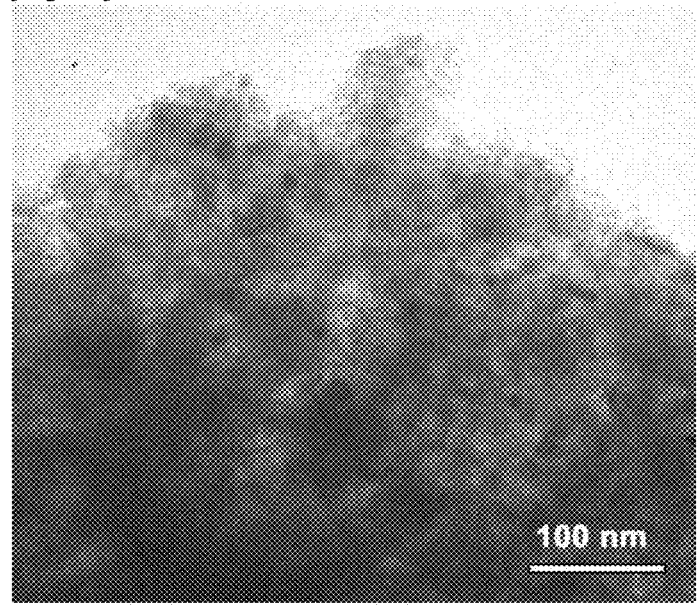
[Fig. 12]
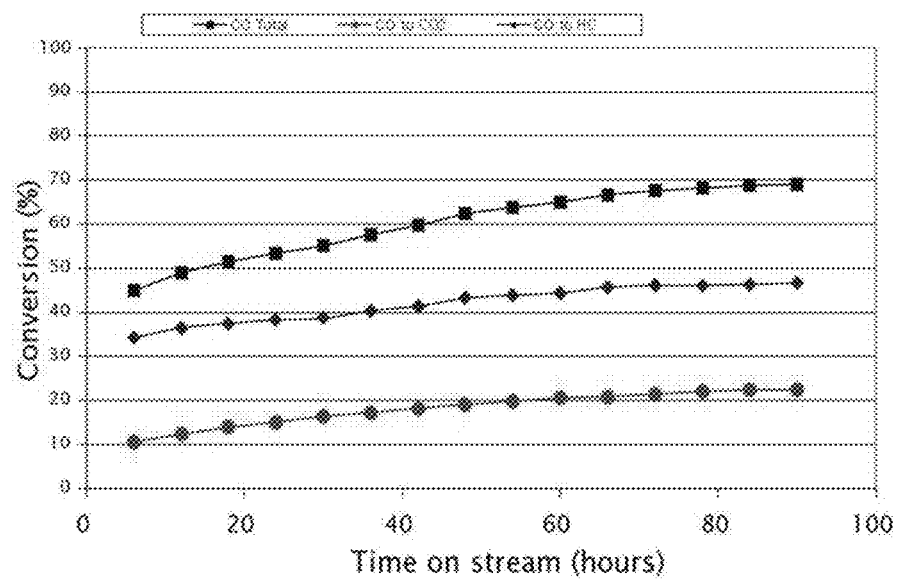

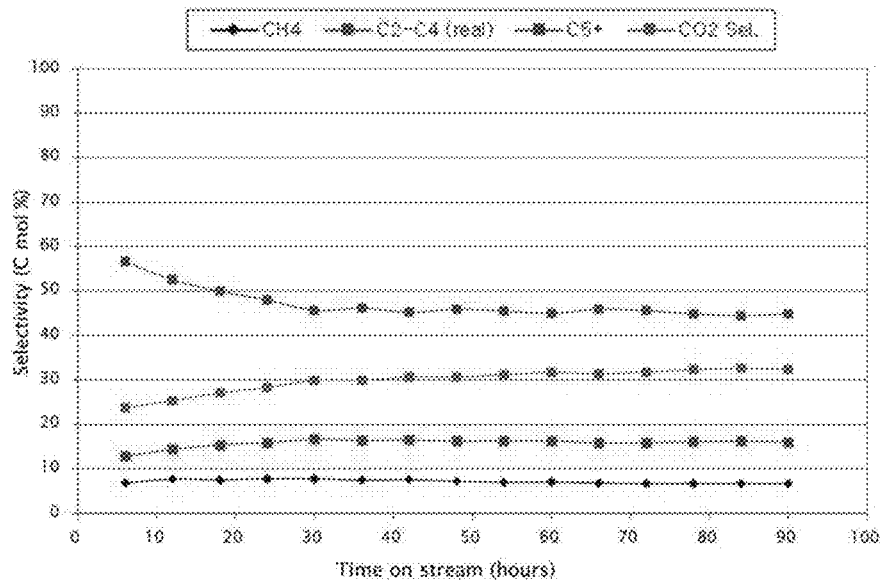
[Fig. 13]

POROUS IRON-SILICATE WITH RADIALLY DEVELOPED BRANCH, AND IRON-CARBIDE/SILICA COMPOSITE CATALYST PREPARED THEREFROM

TECHNICAL FIELD

The present invention relates to a porous iron-silicate with radially developed branches, and an iron-carbide/silica composite catalyst prepared therefrom. Said catalyst may be used as a catalyst for a Fischer-Tropsch synthesis reaction, and a liquid hydrocarbon may be prepared using the same.

BACKGROUND ART

The Fischer-Tropsch (FT, below) synthesis is a technique developed by German chemists Franz Fischer and Hans Tropsch in 1920s, which produces synthetic fuel (hydrocarbons) from synthetic gas (hydrogen and carbon monoxide) according to the following reaction:

$$(2n+1)H_2 + nCO \rightarrow C_nH_{(2n+2)} + nH_2O$$

Catalysts containing cobalt or iron are primarily used in this Fischer-Tropsch synthesis, and reaction conditions such as reaction temperature, reaction pressure, gas composition, and the like are determined based on the type of catalyst to be applied.

The Fischer-Tropsch synthesis can be largely classified depending on the reaction temperature into low temperature Fischer-Tropsch (LTFT) of which reaction is carried out at a temperature range between 200 and 250° C., and high-temperature Fischer-Tropsch (HTFT) of which reaction is carried out at a temperature range between 300 and 350° C. (Andrei Y. Khodakov et al, Chem. Rev., 2007, 107, 1672).

Traditionally, iron-based catalysts are mainly used in the high-temperature FT reaction which is advantageous for the synthesis of $C_2$~$C_4$ light olefin and gasoline-range hydrocarbon products. Since the iron-based catalysts also show activity to the water gas shift reaction, they can be used with various compositions in which a synthetic gas ratio of hydrogen to carbon monoxide varies between 1 and 2. Furthermore, it shows the merit of being used even in the presence of carbon dioxide, a gas impurity.

Industrially, the iron-based catalysts have been applied in commercial FT processes such as CTL (coal-to-liquid) process for preparing a liquid hydrocarbon compound from a raw material of coal as they are inexpensive and strongly tolerant to sulfur-containing compounds. A representative example of the commercial processes includes the synthol process, which uses iron catalysts made of fused Fe produced from Sasol Limited.

The iron-based catalysts have been known to comprise iron carbide as the main active species, and on many researches for increasing the amount of iron carbide in the catalyst have been mostly made to improve the catalyst performance. However, since the structures of carbide/oxide (hydroxide) are formed in a complicated manner in the iron-based catalyst under the active conditions, there is a limit in improving the catalyst performance simply by the earlier researches of increasing the amount of iron carbide in the catalyst.

Meanwhile, if the iron particle is loaded on silica through a wetness impregnation method, it is difficult to uniformly load them in a high concentration of 20 wt % or more. Also, if the iron particle is obtained through a co-precipitation method, there occurs the problem that the particle is large and irregular.

In addition, if metal/silica catalysts are prepared by the earlier co-precipitation or wetness impregnation method, it gives such demerits that the particle size becomes larger and more irregular due to the agglomeration of particles when the metal content is increased, and that sintering may easily occur during calcination at a high temperature range between 400 and 600° C.

On the other hand, in order to design a compact reactor, it is more advantageous that the content of active metal in the supported catalyst becomes higher. In particular, in such a case of Fischer-Tropsch synthesis, the high loading amount of particle and the stability at a high temperature of 300° C. or more are required.

For securing such a thermal stability, hybrid structures between the active metal substances and porous silica which is recently used as a support in a supported catalyst have been developed, and such approaches for various structures like a core-shell structure, etc. have been attempted (Park et al., J. Mater. Chem., 2010, 20, 1239-1246).

Recently, Korean Patent Laid-open Publication No. 10-2013-0045024 discloses a method of manufacturing a metal/silica catalyst support via a branched metal silicate structure. When this catalyst is used in a high-temperature catalytic reaction, the active metal may be loaded in a high amount, and its thermal stability is high, thereby effectively providing a high performance. However, it also gives such disadvantages as complicated synthesis and long manufacturing time to make a mass production thereby difficult.

DETAILED DESCRIPTION OF THE INVENTION

Technical Problem

Differently from the conventional high-temperature catalytic reaction using a reduced metal particle as the active site, the active species in the Fischer-Tropsch reaction is not metallic iron but iron-carbide. Therefore, it is an object of the present invention to provide an iron-carbide/silica composite catalyst that is thermally stable, has a high loading content of the active iron component, has a large specific surface area and well-developed pores, and accordingly exhibits the stability under the reaction conditions of high temperature and high pressure, the high CO conversion and selectivity when used as a catalyst in the Fischer-Tropsch synthesis.

It is also another object of the present invention to provide a porous iron-silicate as an intermediate for preparing the iron-carbide/silica composite catalyst, whose synthetic process is simple, manufacturing time is short, and mass production is possible.

Furthermore, it is another object of the present invention to provide an optimized process capable of converting the porous iron-silicate with radially developed branches to the activated iron-carbide.

Technical Solution

In a first aspect, the present invention provides a porous iron-silicate with radially developed branches, which is formed by a hydrothermal reaction of an aqueous solution containing an iron salt hydrate and a silica particle whose a structure has a role as a transformation template.

In a second aspect, the present invention provides a method of preparing the porous iron-silicate with radially developed branches, which comprises the steps of (i) heating a silica solution wherein a silica particle is mixed with a basic reagent; (ii) introducing an aqueous solution containing iron salts hydrate to said heated silica solution; and (iii) decomposing a mixed solution of the iron salt hydrate and silica through a high-temperature hydrothermal reaction to form the porous iron-silicate.

In a third aspect, the present invention provides an iron-carbide/silica composite catalyst which is obtained by activating, through a high-temperature calcination, the porous iron-silicate with radially developed branches formed by a hydrothermal reaction of an aqueous solution containing an iron salt hydrate and a silica particle whose a structure has a role as a transformation template.

In a fourth aspect, the present invention provides a method of preparing a liquid hydrocarbon from synthetic gas, which comprises a first step of applying the porous iron-silicate according to the first aspect of the present invention or the composite catalyst according to the third aspect of the present invention to a reactor; a second step of optionally activating the porous iron-silicate or the composite catalyst to form the iron-carbide/silica composite catalyst under a carbon monoxide-containing gas atmosphere; and a third step of carrying out the Fischer-Tropsch synthesis reaction on the synthetic gas in the presence of the activated iron-carbide/silica composite catalyst.

The present invention will be explained in detail below.

The present invention is based on the observation that the iron-silicate structure in a shape of branches having a large surface area can be formed, if the silica structure of which shape is controlled to the level of nanometer is used as a transformation template.

Therefore, the porous iron-silicate with radially developed branches according to the present invention is characterized by being formed through a hydrothermal reaction of an aqueous solution containing an iron salt hydrate and a silica particle, wherein the structure of silica particles is used as a transformation template. Also, the present invention is characterized in that the branch-shaped iron-silicate particle having a large specific surface area and well-developed pores can be easily prepared through a hydrothermal reaction between a (nano)silica particle and iron hydrate salts.

In an embodiment, the method of preparing the porous iron-silicate with radially developed branches according to the present invention comprises the steps of (i) heating a silica solution wherein a silica particle is mixed with a basic reagent; (ii) introducing an aqueous solution containing an iron salts hydrate to said heated silica solution; and (iii) decomposing a mixed solution of the iron salts hydrate and silica through a high-temperature hydrothermal reaction to form the porous iron-silicate.

The method of preparing the porous iron-silicate according to the present invention may further comprise the step of (iv) recovering the porous iron-silicate obtained from hydrothermal reaction by a centrifuge and then washing the same.

The iron hydrate used in the present invention may include the water soluble iron (III) chloride hexahydrate, iron (II) chloride tetrahydrate, iron (III) nitrate nonahydrate, iron (III) sulfate hydrate, iron (II) perchlorate hydrate, iron (II) sulfate hydrate, or mixtures thereof.

During the formation of the porous iron-silicate with radially developed branches, the silica particle may perform a role of support as a structural promoter. Thus, the silica particle may be a regular-shaped nanostructure.

The silica particle may take the shape of nonporous particle, or it may be a porous particle having the surface area of 50~1000 $m^2/g$ and the pore volume of 0.2~3.0 $cm^3/g$. The nonporous silica particle may be prepared by the stober method. Also, the silica particle may be a silica nanobead, which can be prepared by the stober method, a silica sol, or a silica structure having mesopores. For example, sphere-shaped silica nanobeads capable of being synthesized by the stober method, commercial silica nanoparticles of Sigma Aldrich Co (LUDOX-AS 40), as well as various silica structures having mesopores such as SBA-15 (SBA=Santa Barbara), KIT-6 (KIT=KAIST), HMS, MSU-F (MSU=Michigan state university), MCM-41 (MCM=Mobil Composition of Matter), MSU-H, FDU-12 (FDU=Fairleigh Dickinson University), MCF (mesocellular siliceous foam), and the like may be utilized.

For the purpose of preparing the porous iron-silicate with well-developed branches, the iron salt may be used in the amount of 0.3 eq.~2.8 eq. with respect to silica ($SiO_2$).

The porous iron-silicate according to the present invention is preferably prepared by subjecting the aqueous solution containing an iron salt hydrate and a silica particle to a hydrothermal reaction in basic conditions.

In order to more effectively dissolve the silica, a basic condition, in particular a strongly basic condition is preferable. Unlimited example of the basic reagent includes sodium hydroxide which is inexpensive and well dissolved in water. The amount of solid sodium hydroxide used may be 0.5 to 2 times with respect to the weight of silica. It is preferable to use the same weight ratio of 1:1 in order to easily obtain the iron-silicate structure in the shape of branches.

The reaction temperature during the hydrothermal reaction is preferably raised to the boiling point of water so that the reaction may sufficiently proceed. Here, the reaction atmosphere may be air or nitrogen atmosphere.

For example, the hydrothermal reaction may be carried out in an oil bath of 100° C. or higher by refluxing the reactants for 1~24 hours, thereby the sufficient hydrothermal reaction being achieved. The reaction is not completed when the reaction time is less than 1 hour, and there is no more remarkable change even after any additional reaction when the reaction time exceeds 24 hours.

The porous iron-silicate obtained after the hydrothermal reaction may be separated and recovered via centrifugation. The centrifugation speed may be in the range of 3,000~10,000 rpm, and the time of separation may be in the range of 10~100 minutes.

The precipitated particle may be washed with water or ethanol and then dried under vacuum or air to give a powder. Washing is preferably performed with ethanol for the easy dry of the particle in the next step.

The iron-carbide/silica composite catalyst according to the present invention is formed by activating, through the high-temperature calcination, the porous iron-silicate with radially developed branches, which is formed by a hydrothermal reaction of an aqueous solution containing an iron salt hydrate and a silica particle whose the structure has a role as a transformation template.

The iron-carbide/silica composite catalyst according to the present invention shows the morphology wherein the iron-carbide nanoparticle formed by the activation process is loaded in a high concentration on the silica support.

In preparing the iron-carbide/silica composite catalyst, if the branch-shaped iron-silicate particle having a large specific surface area and well-developed pores according to the present invention are used, the iron-carbide/silica (nano) composite catalyst having an excellent thermal stability may be easily obtained through the activation process. The size of iron-carbide particle loaded on the silica shell is in the level of 10~100 nm to show the optimum activity and selectivity in a Fischer-Tropsch synthesis, and a highly loaded and monodispersed iron-carbide/silica structure that can give the stable and excellent reaction result under the reaction conditions of high temperature and high pressure when utilized as a catalyst for the Fischer-Tropsch reaction may be provided.

The iron-carbide/silica composite catalyst according to the present invention may be formed by activating the porous iron-silicate with radially developed branches according to the present invention under a carbon monoxide-containing gas atmosphere. The thermal treatment at a high temperature under a carbon monoxide atmosphere can give a structure wherein the iron-carbide nanoparticle is uniformly embedded on the external surface of silica particle. For example, the porous iron-silicate with radially developed branches of the present invention may be introduced to a tube-shaped calciner and then thermally treated at a high temperature under a carbon monoxide atmosphere to be converted to the iron-carbide/silica catalyst.

The calcination temperature for activating the porous iron-silicate with radially developed branches of the present invention to the iron-carbide/silica composite catalyst may vary within the range of 300° C.~500° C., preferably 350° C.~400° C. Here, the temperature of thermal treatment applied may be 300° C. or higher at which the starting material can be sufficiently reduced to iron-carbide without any iron oxide component. At the thermal treatment at 500° C. or higher, some agglomeration between particles may occur.

The pure carbon monoxide gas atmosphere is suitable as the gas phase atmosphere during the calcination for the proper change from iron-silicate to iron-carbide, but the formation of iron-carbide is possible even under the mixed gas with carbon dioxide, hydrogen, or nitrogen.

The calcination time is preferably 1~48 hours for the thorough decomposition of iron-silicate hydrate crystal and the crystallization of iron-carbide particle.

The iron-carbide/silica catalyst activated through calcination may be cooled to room temperature and then immersed in an organic passivation solvent for preventing oxidation during distribution and storage thereof.

The passivation process for stabilizing the activated iron-carbide/silica composite catalyst is a very important step when applied to the Fischer-Tropsch reaction later, and it is preferable to use an organic solvent which plays a role of blocking the reaction between the catalyst and oxygen. The organic solvent that can be used for this purpose includes various solvents such as ethanol, mineral oil, etc., and it is not good to use water since water may oxidize or change the catalyst. The passivation may be carried out through the process of directly immersing the catalyst in an organic solvent under nitrogen or other inert gas atmosphere in order not to be exposed to oxygen. It is preferable to use volatile ethanol as the solvent for the later analysis or application to a reactor.

Since the iron-carbide/silica composite catalyst is magnetic, it may be easily separated from the passivation solvent by using a magnet. After the separation, it may be used right after re-drying through the vacuum drying process, or stored after vacuum or nitrogen package.

FIG. 1 is a schematic diagram for the preparation of iron-carbide/silica nano-catalyst which is used for the Fischer-Tropsch synthesis according to an example of the present invention, and FIG. 2 is a flow chart of the preparation of the iron-carbide/silica catalyst in which the highly active iron-carbide nanoparticle is loaded, according to an example of the present invention.

As depicted, the nano-structured silica particle and the iron salt are subjected to hydrothermal reaction to form the iron-silicate structure which is then activated at a high temperature under a carbon monoxide atmosphere to give the iron-carbide phase catalyst having a high reactivity on the Fischer-Tropsch synthesis. This catalyst is thermally stable as well as has a high content of iron particle loaded. For this purpose, the silica structure whose shape is controlled to nanometer level is used as a transformation template in the preparation process to form the branch-shaped iron-silicate structure having a large surface area. Thereafter, this structure is activated again with carbon monoxide gas at a high temperature to give the iron-carbide phase catalyst.

As depicted in FIG. 2, the method of preparing the iron-carbide/silica catalyst according to an example of the present invention may comprise (i) a step of introducing a solid silica nano-structure to a flask with sodium hydroxide (NaOH) as a base reagent and heating them (S100);

(ii) a step of injecting a separate solution wherein an iron salt hydrate is dissolved in water to the silica solution heated previuosly (S200);

(iii) a step of decomposing a mixed solution of the iron salt and silica through a hydrothermal reaction at a high temperature under air atmosphere (S300);

(iv) a step of recovering the iron-silicate crystal obtained through the hydrothermal reaction by a centrifuge and then washing the same (S400);

(v) a step of calcining the washed and dried iron-silicate powder at a high temperature under a carbon monoxide atmosphere to obtain the active iron-carbide/silica catalyst (S500);

(vi) a step of cooling the calcined catalyst to room temperature and then passivating the same using a solvent to prevent oxidation (S600); and (vii) a step of separating the iron-carbide/silica catalyst in a solvent using a magnet and then drying the same (S700).

The method of preparing a liquid hydrocarbon from the synthetic gas according to the present invention may comprise a first step of applying the porous iron-silicate according to the present invention or the iron-carbide/silica composite catalyst according to the present invention to a reactor;

a second step of optionally activating the the porous iron-silicate or the composite catalyst to form the iron-carbide/silica composite catalyst under a carbon monoxide-containing atmosphere; and a third step of carrying out the Fischer-Tropsch synthesis reaction on the synthetic gas in the presence of the activated iron-carbide/silica composite catalyst.

Generally, as the reactor type for the Fischer-Tropsch synthesis, a fixed bed reactor, a slurry bubble column reactor (SBCR), and a fluidized bed reactor may be mentioned. For example, a liquid hydrocarbon may be prepared by introducing the iron-carbide/silica supported catalyst according to the present invention to a tube type fixed bed reactor, injecting synthetic gas, and then carrying out the Fischer-Tropsch synthesis reaction.

Alternatively, a liquid hydrocarbon may be prepared by introducing the porous iron-silicate according to the present invention to a reactor, activating it to the iron-carbide/silica composite catalyst under a carbon monoxide-containing atmosphere, and then carrying out the Fischer-Tropsch synthesis reaction. During the activation, the temperature of thermal treatment is more preferably in the range of 350~400° C. wherein the Hägg-carbide—an active type of iron-carbide may be well formed.

The synthetic gas may be carbon monoxide and hydrogen, or carbon monoxide and hydrogen with which one or more impurities selected from the group consisting of inert gas, methane and carbon dioxide are mixed.

The synthetic gas may be those of which $H_2/CO$ is controlled to 0.7 to 1. The $C_{5+}$ productivity may be reduced when $H_2/CO$ is less than 0.7, and the $C_{5+}$ selectivity and $C_{5+}$ productivity may be reduced when $H_2/CO$ exceeds 1. It is desirable to use carbon monoxide and hydrogen in the volume ratio of 1:1 for high yield of product.

In the third step, the synthetic gas may be injected to a reactor in the gas hourly space velocity (GHSV) of 3.0~42.0 NL/g(cat)/hr. The reaction may proceed without any difficulty but there occurs the problem that productivity of a liquid hydrocarbon per unit time is low when the gas hourly space velocity is less than the above range, and the CO conversion may be reduced when more synthetic gas than the above gas hourly space velocity is injected.

It is preferable that the reaction temperature in the third step is 250~350° C. It is more preferable that the reaction is proceeding at 300~350° C. to increase the CO conversion and the yield of liquid hydrocarbon. The reaction pressure may be between 1 and 3 MPa.

If the iron-carbide/silica composite catalyst according to the present invention is applied in the Fischer-Tropsch synthesis reaction, it shows significantly high CO conversion, low selectivity of methane, and high selectivity of liquid hydrocarbon having $C_{5+}$ or more at a high temperature condition of 300° C. or more.

Advantageous Effect

The present invention shows such advantages as follows:
The porous iron-silicate having large specific surface area and well-developed pores can be easily prepared through a hydrothermal reaction of a (nano)silica particle with an iron salt hydrate.
The catalyst for the Fischer-Tropsch synthesis reaction wherein the iron-carbide nanoparticle formed through the additional activation process is loaded on a silica support in a high concentration can be synthesized.
The iron-carbide/silica composite catalyst obtained by activating the porous iron-silicate having large specific surface area and well-developed pore is very appropriate as a catalyst since its (nano)structure is thermally very stable and the size of iron-carbide particle loaded on the silica shell is between 10~100 nm showing the optimum activity and selectivity in the Fischer-Tropsch synthesis reaction.
When the catalyst is applied in the Fischer-Tropsch synthesis reaction, it shows significantly high CO conversion, low selectivity of methane, and high selectivity of liquid hydrocarbon having $C_{5+}$ or more at a high temperature condition of 300° C. or more.

Therefore, the iron-carbide/silica composite catalyst according to the present invention is an excellent catalyst for the Fischer-Tropsch reaction and also can be applied even in commercial processes, thereby being highly expected to have industrial applicability.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 is a schematic diagram for the preparation of iron-carbide/silica nano-catalyst which is used for the Fischer-Tropsch synthesis according to an example of the present invention.

FIG. 2 is a flow chart of the preparation of the iron-carbide/silica catalyst in which the highly active iron-carbide nanoparticle is loaded, according to an example of the present invention.

FIG. 3 shows SEM images (a, b) of the silica nanobead support which is prepared by the stober method, and TEM images (c-d) and XRD spectrum (e) of the porous iron-silicate obtained therefrom.

FIG. 4 shows TEM images at a low magnification (a) and at a high magnification (b) of the iron-silicate particle using 1.4 eq. of iron salt with respect to silica.

FIG. 5 shows TEM images at a low magnification (a) and at a high magnification (b) of the iron-silicate particle using 2.8 eq. of iron salt with respect to silica.

FIG. 6 shows TEM images of the porous silica MCF structure (a) and the iron-silicate particle (b) obtained from the same.

FIG. 7 shows TEM images at a low magnification (a) and at a high magnification (b) of the iron-silicate particle using the commercial LUDOX silica particle.

FIG. 8 shows TEM images at a low magnification (a) and at a high magnification (b) of the iron-silicate particle prepared by using silica nanobead support and iron nitrate hydrate.

FIG. 9 shows TEM images at a low magnification (a) and at a high magnification (b) of the iron-silicate particle prepared by using silica nanobead support and iron sulfate hydrate.

FIG. 10 shows TEM images (a, b) and XRD spectrum (c) of the iron-carbide/silica catalyst activated from the iron-silicate powder according to Example 1 of the present invention.

FIG. 11 shows a TEM image of the iron-carbide/silica catalyst activated from the iron-silicate powder according to Example 2 of the present invention.

FIG. 12 shows the CO conversion with the time lapse in the Fischer-Tropsch synthesis reaction using the iron-carbide/silica catalyst according to Example 6 of the present invention.

FIG. 13 shows the product selectivity with the time lapse of the iron-carbide/silica catalyst according to Example 6 of the present invention.

DETAILED DESCRIPTION OF THE EMBODIMENTS

Hereinafter, the present invention will be explained more in detail. However, these examples are provided only for illustration of the present invention, and should not be construed as limiting the present invention.

Example 1

Synthesis of Branch-Shaped Iron-Silicate Structure Using Silica Nanobead

The silica nanoparticle capable of being used as the silica support were prepared by the well known stober method.

In order to obtain the spherical silica particle first, to a solution containing 1 L of ethanol and 80 mL of distilled water were added 40 mL of ammonium hydroxide solution (28%) and 100 mL of tetraethyl orthosilicate (TEOS), which was then stiffed for 2 hours. The silica particle obtained after 2 hours was precipitated through centrifugation and then dispersed in ethanol. In order to minimize the amount of ammonia that can be remained even after washing, two or more washings were performed by repeating the dispersion-precipitation process using ethanol. Thus washed silica particle was sufficiently dried in a vacuum oven of which temperature was set to 50° C.

The scanning electron microscopy (SEM) images of thus obtained silica particles were shown in FIGS. 3(a) and (b). From the analysis results, it was confirmed that silica particles having the size of 220 nm were produced.

Next, 70 mL of distilled water, 1.0 g of sodium hydroxide and 1.0 g (16.6 mmol) of thus obtained silica particles were added together to a 250 mL 2-neck round bottomed flask, and stirred under air atmosphere while raising the temperature to 100° C. Thereafter, a solution of 2.3 g (11.6 mmol) of iron chloride hydrate ($FeCl_2 \cdot 4H_2O$) dissolved in 30 mL of distilled water, which had been prepared in advance, was injected to the silica solution heated to 100° C., and refluxed for 5 hours.

After 5 hours, the temperature was lowered to room temperature to stop the reaction. The cooled colloidal solution was precipitated by centrifugation at 10,000 rpm for 30 minutes and washed twice or more by repeating the dispersion-precipitation process using ethanol.

The transmission electron microscopy (TEM) images and XRD analysis results thus obtained were shown in FIGS. 3(c), (d) and (e). From these analysis results, it was confirmed that silica and the iron salt were reacted during the hydrothermal reaction in the presence of a base to be converted to a branch-shaped iron-silicate structure.

Reference Example 1

Shape Change Depending on Increase of Iron Salt

The same procedure as Example 1 was carried out except that the amount of iron chloride hydrate ($FeCl_2 \cdot 4H_2O$) used was changed to 4.6 g (23.1 mmol) and 9.3 g (46.8 mmol), respectively.

The result of experiment as depicted in FIG. 4(b) shows that the branch-shaped structure of the iron-silicate particle was maintained to a certain degree until 1.4 eq. of iron salt was used with respect to silica. However, as shown in FIG. 5, when the amount iron salt was significantly increased to 2.8 eq. with respect to silica, the branch-shaped structure was destroyed and some agglomeration of particles was observed.

Example 2

Synthesis of Branch-Shaped Iron-Silicate Structure Using Porous Silica MCF Structure In order to obtain the porous silica MCF as the silica support, first, 8.0 g of pluronic P123 ($EO_{20}PO_{70}EO_{20}$, Aldrich) was well dissolved and dispersed in 300 g of distilled water. To this solution were added 12 g of 1,3,5-trimethylbenzene (TMB or mesitylene) and 300 g of 1.6 M HCl, which was then stirred for 1 hour at 50° C. Then, 17.7 g of TEOS was added and the mixture was further stirred for 20 hours at 50° C., which was then transferred to a polypropylene (P.P) container and sealed with a stopper. It was introduced into an oven of which temperature was set to 100° C. and aged for 24 hours. After aging, it was cooled to room temperature, washed with distilled water, ethanol and acetone in the order, and dried at room temperature. Finally, the white powder thus obtained was calcined for 8 hours under air atmosphere at 500° C. to synthesize MCF. The structure of MCF thus obtained could be analyzed through the TEM image as shown in FIG. 6(a) to confirm the degree of pore formation, and it was confirmed that pores in the level of 30 nm were well formed.

Next, in order to obtain the branch-shaped iron-silicate particle, 70 mL of distilled water, 1.0 g of sodium hydroxide and 1.0 g of thus obtained MCF powder were added together to a 250 mL 2-neck round bottomed flask, and stirred under air atmosphere while raising the temperature to 100° C. Thereafter, a solution of 2.3 g of iron chloride hydrate ($FeCl_2 \cdot 4H_2O$) dissolved in 30 mL of distilled water, which had been prepared in advance, was injected to the silica solution heated to 100° C., and refluxed for 5 hours. After 5 hours, the temperature was lowered to room temperature to stop the reaction. The cooled colloidal solution was precipitated by centrifugation at 10,000 rpm for 30 minutes and washed twice or more by repeating the dispersion-precipitation process using ethanol. The TEM image of thus obtained iron-silicate particle was shown in FIG. 6(b).

From the analysis result, it was confirmed that MCF and the iron salt were reacted during the hydrothermal reaction in the presence of a base to be converted to a branch-shaped iron-silicate structure.

Example 3

Synthesis of Branch-Shaped Iron-Silicate Structure Using Commercial Silica Sol 70 mL of distilled water, 1.0 g of sodium hydroxide and 2.5 mL ($SiO_2$ 1 g) of Ludox AS-40 (40 wt % suspension in $H_2O$) solution commercially available from Sigma Aldrich Corporation were added together to a 250 mL 2-neck round bottomed flask, and stiffed under air atmosphere while raising the temperature to 100° C. Thereafter, a solution of 2.3 g of iron chloride hydrate ($FeCl_2 \cdot 4H_2O$) dissolved in 30 mL of distilled water, which had been prepared in advance, was injected to the silica solution heated to 100° C., and refluxed for 5 hours. After 5 hours, the temperature was lowered to room temperature to stop the reaction. The cooled colloidal solution was precipitated by centrifugation at 10,000 rpm for 30 minutes and washed twice or more by repeating the dispersion-precipitation process using ethanol.

The TEM images of thus obtained iron-silicate particle were shown in FIGS. 7(a) and (b). From the analysis results, it was confirmed that the silica sol and the iron salt were reacted during the hydrothermal reaction in the presence of a base to be converted to a branch-shaped iron-silicate structure.

Example 4

Synthesis of Branch-Shaped Iron-Silicate Structure Using Iron Nitrate Hydrate 70 mL of distilled water, 1.0 g of sodium hydroxide and 1.0 g of the silica particle in the size level of 220 nm which had been prepared by the stober method of Example 1 were added together to a 250 mL 2-neck round bottomed flask, and stirred under air atmosphere while raising the temperature to 100° C. Thereafter, a solution of 2.9 g (7.2 mmol) of iron nitrate hydrate ($Fe(NO_3)_3 \cdot 9H_2O$)—instead of the iron chloride hydrate used in Examples 1 to 3—dissolved in 30 mL of distilled water, which had been prepared in advance, was injected to the silica solution heated to 100° C., and refluxed for 5 hours. After 5 hours, the temperature was lowered to room temperature to stop the reaction. The cooled colloidal solution was precipitated by centrifugation at 10,000 rpm for 30 minutes and washed twice or more by repeating the dispersion-precipitation process using ethanol.

The TEM images of thus obtained iron-silicate particle were shown in FIG. 8. From the analysis results, it was confirmed that the silica particle and the iron salt were reacted during the hydrothermal reaction in the presence of a base to be converted to a branch-shaped iron-silicate structure.

Example 5

Synthesis of Branch-Shaped Iron-Silicate Structure Using Iron Sulfate Hydrate ($FeSO_4 \cdot 7H_2O$)

70 mL of distilled water, 1.0 g of sodium hydroxide and 1.0 g of the silica particle in the size level of 220 nm which had been prepared by the stober method of Example 1 were added together to a 250 mL 2-neck round bottomed flask, and stirred under air atmosphere while raising the temperature to 100° C. Thereafter, a solution of 2.0 g (7.2 mmol) of iron sulfate hydrate ($FeSO_4 \cdot 7H_2O$) dissolved in 30 mL of distilled water, which had been prepared in advance, was injected to the silica solution heated to 100° C., and refluxed for 5 hours. After 5 hours, the temperature was lowered to room temperature to stop the reaction. The cooled colloidal solution was precipitated by centrifugation at 10,000 rpm for 30 minutes and washed twice or more by repeating the dispersion-precipitation process using ethanol.

The TEM images of thus obtained iron-silicate particle were shown in FIG. 9. From the analysis results, it was confirmed that the silica particle and the iron salt were reacted during the hydrothermal reaction in the presence of a base to be converted to a branch-shaped iron-silicate structure.

Example 6

Preparation of Iron-Carbide/Silica Catalyst

The iron-silicate powder of Example 1 synthesized from the silica bead was thermally treated under carbon monoxide atmosphere at 400° C. for 4 hours (normal pressure, flow rate of 200 mL/min) in a tube type calcining oven to give an iron-carbide/silica composite catalyst.

As a result, as can be seen from the TEM images of FIGS. 10(a) and (b), it was confirmed that small iron-carbide particles having the size of 20~40 nm were loaded on silica when thermally treated at 400° C. In case of the catalyst sample finally obtained, the result of measurement by ICP (Inductively coupled plasma/optical emission spectrometry) for analyzing the content of iron ingredient showed that the content of Fe was about 21 wt %.

Example 7

Preparation of Iron-Carbide/Silica Catalyst

The iron-silicate powder of Example 2 synthesized from the silica MCF structure was thermally treated under carbon monoxide atmosphere at 350° C. for 4 hours (normal pressure, flow rate of 200 mL/min) in a tube type calcining oven to give an iron-carbide/silica composite catalyst.

As a result, as can be seen from the TEM image of FIG. 11, it was confirmed that very small iron-carbide particles having the level of 10~20 nm were loaded on silica when thermally treated at 350° C.

Example 8

Fischer-Tropsch Synthesis Using Iron Carbide/Silica Catalyst

The Fischer-Tropsch synthesis reaction was carried out based on the iron-carbide/silica catalyst obtained in Example 6. The reactor was a fixed-bed reactor, and the reaction proceeded under an automated system that can be operated by PC (personal computer).

0.3 g of the catalyst after dried was directly loaded in a reactor having the inner diameter of 5 mm. In order to prevent the production of hot spots due to the serious heat in the catalyst during the reaction, 3.4 g of glass bead was additionally introduced thereto.

Also, after the catalyst was loaded inside the reactor, it was further activated for 4 hours under carbon monoxide atmosphere (40 mL/min) of normal pressure to return some oxidized part on the surface of the catalyst to pure iron-carbide, prior to the main reaction.

Thereafter, the synthetic gas of which hydrogen to carbon monoxide ratio was maintained at 1:1 was injected to the reactor under the conditions of 15 atm of reaction pressure and 8.0 NL/G(cat)-h of gas hourly space velocity (GHSV) to carry out the Fischer-Tropsch synthesis reaction at 320° C.

The results of reaction for 90 hours thereafter were depicted in FIGS. 12 and 13. Very excellent results were obtained such that even though only a small amount of catalyst was used with respect to the reactant flow, the CO conversion was increased to the level of 70% as shown in FIG. 12, and the selectivity of liquid hydrocarbon ($C_{5+}$) approached the level of 45% as shown in the product selectivity graph of FIG. 13.

It should be understood that the present invention is not intended to be unduly limited by the illustrative examples set forth herein, various modifications to this invention will become apparent to those skilled in the art without departing from the gist of the claimed invention, and such modifications are within the scope of the claims.

The invention claimed is:

1. A method of preparing a porous iron-silicate with radially developed branches, comprising the steps of:
    (i) heating a silica solution wherein a silica particle is mixed with a basic reagent;
    (ii) introducing an aqueous solution containing an iron salt hydrate to said heated silica solution; and
    (iii) decomposing a mixed solution of the iron salt hydrate and silica through a high-temperature hydrothermal reaction to form the porous iron-silicate.

2. The method of claim 1, wherein the silica particle has a surface area of 50~1000 $m^2/g$ and a pore volume of 0.2~3.0 $cm^3/g$.

3. The method of claim 1, wherein the basic reagent is sodium hydroxide and the amount of solid sodium hydroxide used is 0.5 to 2 times with respect to the weight of silica.

4. The method of claim 1, wherein the silica particle is a silica nanobead, a silica sol, or a silica structure having mesopores.

5. The method of claim 1, wherein the iron hydrate used in said Step (ii) is selected from the group consisting of iron (III) chloride hexahydrate, iron (II) chloride tetrahydrate, iron (III) nitrate nonahydrate, iron (III) sulfate hydrate, iron (II) perchlorate hydrate, and iron (II) sulfate hydrate.

6. The method of claim 1, wherein the hydrothermal reaction in said Step (iii) is carried out in an oil bath of 100° C. or higher by refluxing the reactants for 1~24 hours.

7. The method of claim 1, wherein the porous iron-silicate obtained after said Step (iii) is centrifuged at a speed of 3,000~10,000 rpm for 10~100 minutes.

8. A method of preparing an iron-carbide/silica composite catalyst, comprising the steps of:
  preparing a porous iron-silicate with radially developed branches, wherein the preparing comprises:
   (i) heating a silica solution wherein a silica particle is mixed with a basic reagent;
   (ii) introducing an aqueous solution containing an iron salt hydrate to said heated silica solution; and
   (iii) decomposing a mixed solution of the iron salt hydrate and silica through a high-temperature hydrothermal reaction to form the porous iron-silicate; and
  activating, through a high temperature calcination step, the porous iron-silicate with radially developed branch.

9. The method of claim 8, wherein the iron-carbide/silica composite catalyst is obtained by activating the porous iron-silicate under a carbon monoxide-containing atmosphere.

10. The method of claim 8, wherein the size of iron-carbide particle loaded on the silica shell is 10~100 nm.

11. The method of claim 8, wherein the activated iron-carbide/silica catalyst is immersed in an organic passivation solvent for preventing oxidation.

12. The method of claim 11, wherein the organic passivation solvent is ethanol or mineral oil.

13. The method of claim 8, wherein the calcination temperature is in the range of 350° C.~400° C.

* * * * *